United States Patent [19]

Didier

[11] Patent Number: 4,470,343
[45] Date of Patent: Sep. 11, 1984

[54] OUTDOOR COOKER

[76] Inventor: Irvin M. Didier, 1605 Maple, Glenview, Ill. 60025

[21] Appl. No.: 275,432

[22] Filed: Jun. 19, 1981

[51] Int. Cl.³ .............................................. A47J 37/04
[52] U.S. Cl. ...................................... 99/427; 99/446; 99/447; 99/448; 126/25 R
[58] Field of Search ................. 99/427, 444, 446, 343, 99/347, 443 C, 443 R, 448, 450, 337, 421 P, 402, 447; 126/25 R, 25 AA, 26

[56] References Cited

U.S. PATENT DOCUMENTS

| | | | |
|---|---|---|---|
| 2,039,541 | 5/1936 | Lekometros | 99/421 P |
| 2,735,358 | 2/1956 | Gilbert | 99/427 |
| 2,747,497 | 5/1956 | Brown | 99/427 |
| 2,760,428 | 8/1956 | Boyajian | 99/402 X |
| 2,839,989 | 6/1958 | Persinger | 99/427 |
| 3,025,783 | 3/1962 | Coudek | 99/448 X |
| 3,045,582 | 7/1962 | Wells | 99/427 X |
| 3,247,827 | 4/1966 | Cremer | 99/446 X |
| 3,316,831 | 5/1967 | Koland | 99/402 X |
| 3,324,788 | 6/1967 | La France | 99/446 X |
| 3,331,365 | 7/1967 | Sussan | 126/25 R |
| 3,504,620 | 4/1970 | Gerhardt | 99/427 |
| 3,683,791 | 8/1972 | Rast | 99/446 |
| 3,792,654 | 2/1974 | Turner | 99/427 |
| 3,861,290 | 1/1975 | Ringo | 99/421 P X |
| 4,165,683 | 8/1979 | Van Gilst | 99/427 X |

Primary Examiner—Billy J. Wilhite
Attorney, Agent, or Firm—Hill, Van Santen, Steadman & Simpson

[57] ABSTRACT

An outdoor cooker for baking or broiling food articles includes a covered base within which there is rotatably supported a horizontal shaft above a combustion chamber. A plurality of food baskets are secured to the shaft and extend radially therefrom for movement only about the rotational axis of the shaft toward and away from the combustion chamber. The fuel is supported in a pair of slidably removable drawers that are disposed below and on opposite sides of the shaft, the spacing between the drawers defining a grease-drip space. The basket arrangement provides a high cooking capacity construction that eliminates turning over and basting the food, that minimizes the flaming of grease drippings, and the construction facilitating selective starting and stopping of the application of heat.

3 Claims, 3 Drawing Figures

OUTDOOR COOKER

BACKGROUND OF THE INVENTION

1. Field of the Invention:

This invention pertains to an outdoor cooker.

2. The Prior Art:

A number of different types of outdoor cookers or charcoal grills have been previously marketed. One of the more successful types has included a base formed as a kettle normally closed by a removable cover, the base and cover having draft and vent holes that can be adjusted from fully opened to fully closed. The cover has a handle to enable it to be lifted off the base, and the base typically has three legs with wheels disposed at two of the legs. Within the kettle or base, there is a lower rack or grate on which charcoal is placed, and above that there is an upper rack or grill upon which the food to be broiled or baked is placed. Juices such as fat drip from the food onto the charcoal, but when the cover is in place, there is no flame due to a lack of oxygen. Although the food is cooked from below, and although the cover reflects heat back to the upper side of the food, it is necessary to turn the food over once, substantially midway during the broiling. In order to turn the food over, it is necessary to remove the cover, thus increasing the likelihood of unwanted flaming. Furthermore, the labor of turning the food over is still involved. Even worse, even though the size of the kettle is increased to be about four or five feet in diameter, even such an outdoor cooker has a limited capacity. Further, the time that the cover is off is greatly increased with a large area grill, the risk of flaming is somewhat increased, and owing to prevailing winds, it may not be possible to stand at the down-wind side, and therefore reaching across a relativly large grill requires utensils having oversized lengths. In summary, such cookers are really not ideally suited when large quantities of food are to be prepared for large groups of people.

SUMMARY OF THE INVENTION

The present invention is directed to an outdoor cooker which embodies a unique combination of features that enables an outdoor cooker to have a high volume cooking capacity, and which eliminates the need for manual turning over of the food article being grilled, and in the instance of foods containing fat, self-basting. In addition, even with a large quantity of food loaded into the cooker, a uniformity of degree of cooking is achieved. To this end, a horizontal shaft supports a plurality of food baskets that extend radially therefrom for movement about the rotational axis of the shaft, toward and away from a combustion chamber located therebeneath. The fuel is contained in one or more horizontally slidable drawers so that the source of heat can be moved away from the food so as to avoid overcooking food in a lowermost basket while the food in an uppermost basket is being loaded or unloaded. A fuel-free zone is provided immediately below the shaft where substantially all the drippings fall, thereby avoiding the combustion of the same, even though a relatively large amount of fat or grease may be involved.

Accordingly, it is an object of the present invention to provide an outdoor cooker that has a capacity for simultaneously broiling or baking a large amount of food items.

A further object of the present invention is to prevent or minimize the amount of fat or grease dripping from the food articles that becomes flamed off.

A still further object of the present invention is to provide uniformity of cooking the individual articles or pieces of food.

Yet another object of the present invention is to minimize the amount of human labor that is needed for the preparation of a large quantity of food, while at the same time minimizing the amount of physical discomfort that personnel operating the equipment experiences.

Many other advantages, features and additional objects of the present invention will become manifest to those versed in the art upon making reference to the detailed description and the accompanying drawings in which a preferred structural embodiment incorporating the principles of the present invention is shown by way of a illustrative example.

ON THE DRAWINGS

AS SHOWN ON THE DRAWINGS

Figure 1:
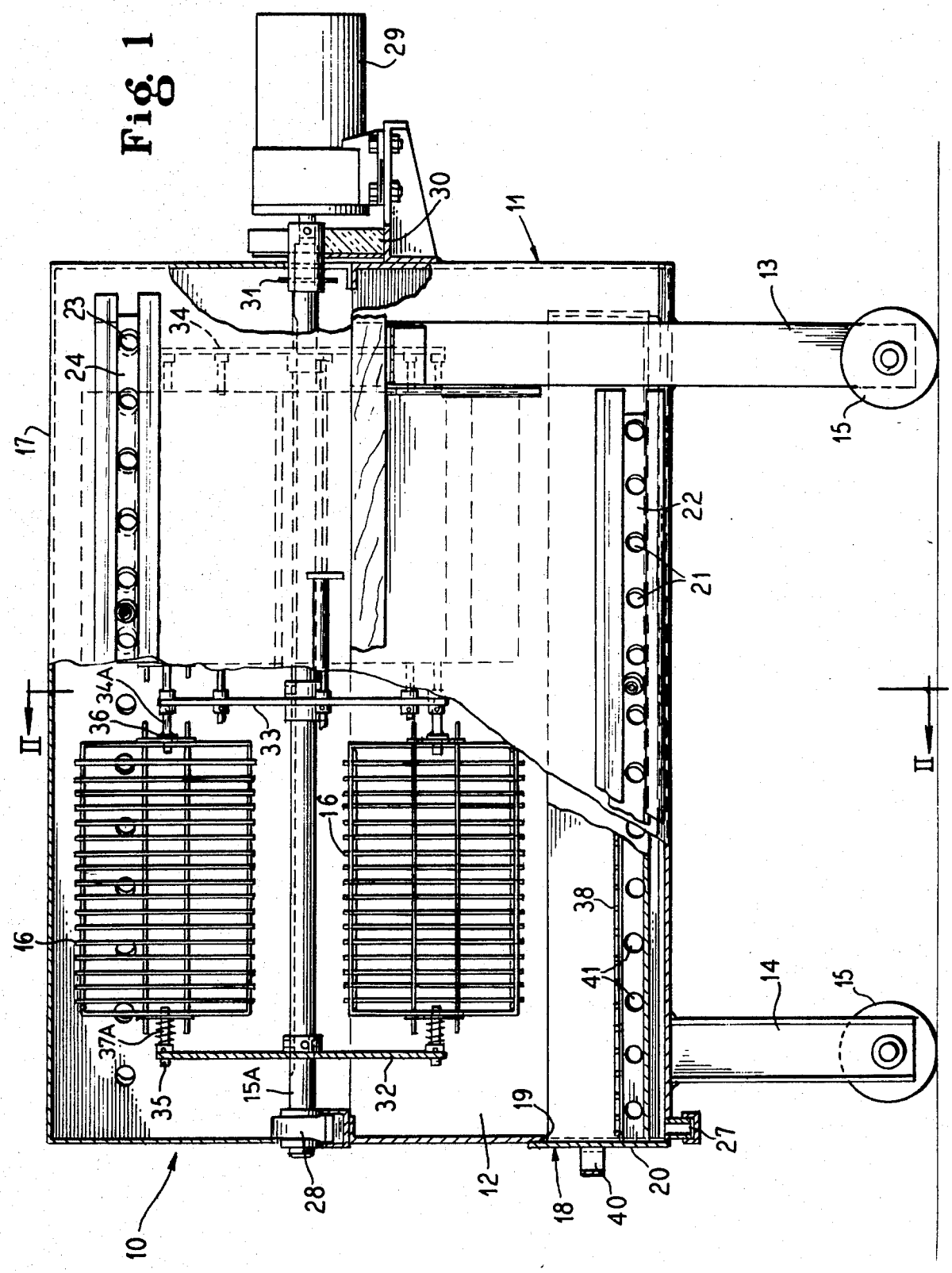
FIG. 1 is a side elevational view, partially broken away, showing an outdoor cooker provided in accordance with the principles of the present invention.

The principles of the present invention are embodied in an outdoor cooker such as shown in FIG. 1, generally indicated by the numeral 10. The cooker 10 includes a base 11 having therein a combustion chamber 12, the base being supported by four support legs including a pair of front legs 13 and a pair of rear legs 14, each leg 13, 14 having a wheel 15. A horizontal shaft 15A is rotatably supported on the base 11, and to it is secured a plurality of food baskets 16 which extend radially from the shaft 15A for movement about the rotational axis of the shaft, toward and away from the combustion chamber 12. A cover 17 encloses the upper portion of the orbital path of the food baskets 16. Within the combustion chamber 12, there is provided at least one drawer 18 receptive of fuel for being burned therein, each drawer being selectively horizontally slidable through an opening 19 in the base 11. The opening 19 is closed by a door 20 which may form the end of the drawer 18.

The base 11 is provided with a number of draft holes 21, the extent to which they are opened being controllable by the position of an apertured damper slide 22. Similarly, the cover 17 has a number of vent holes 23 and the extent to which they are opened is adjustable by the position of a further damper slide 24. The draft and vent hole structure shown in FIG. 1 at the front of the outdoor cooker 10 is also provided on the rear side of the base 11 and cover 17 as shown in FIG. 2.

Figure 2:
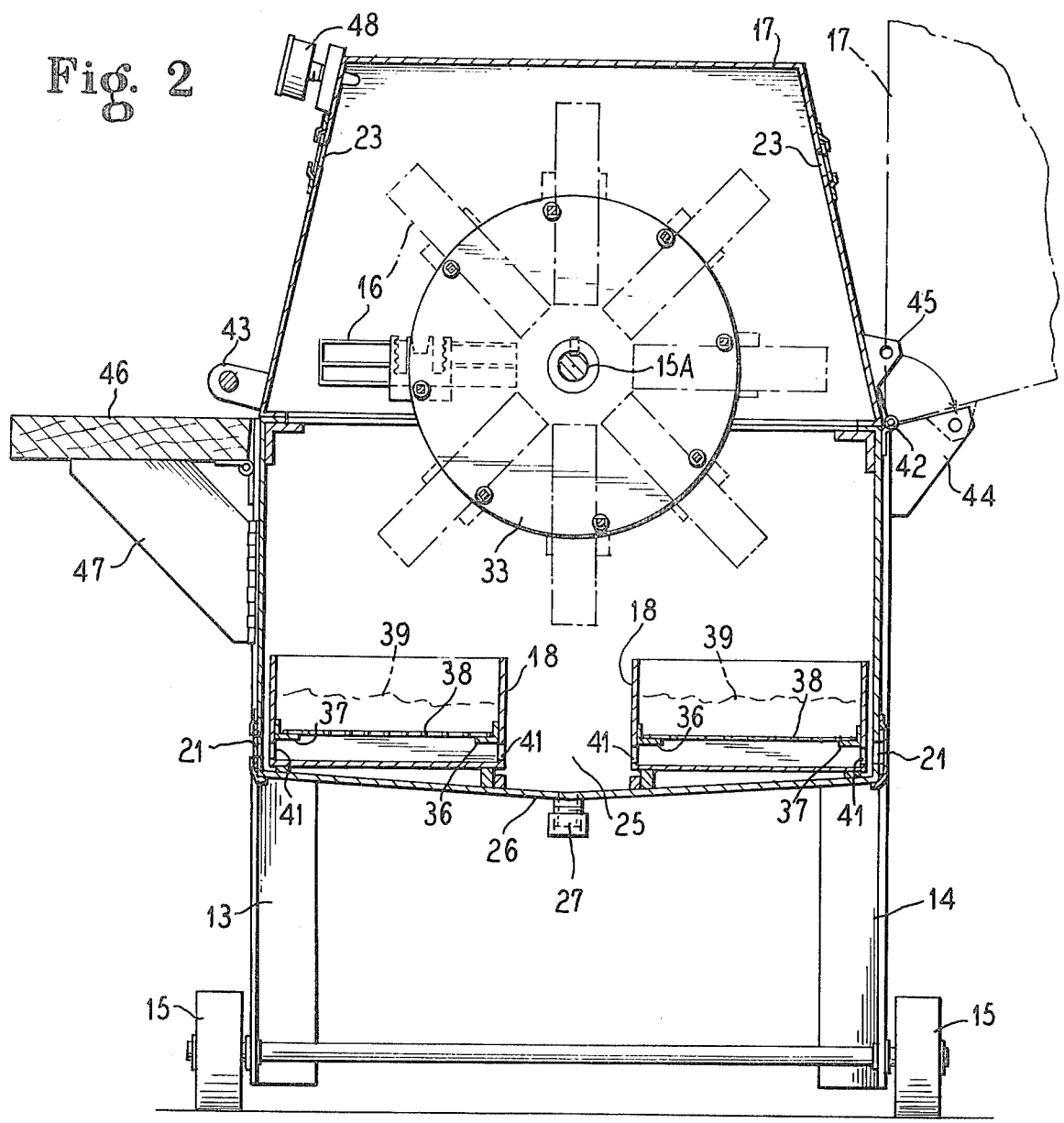
FIG. 2 is a cross-sectional view taken along line II—II of FIG. 1.

As best shown in FIG. 2, there are two drawers 18, 18 that are spaced apart horizontally so that they lie at opposite sides of axis of the shaft 15A, thereby leaving a drip space 25 which communicates with a centrally sloping bottom 26 of the base 11, the same being provided with a drain 27.

As shown in FIG. 1, the shaft 15A is supported at its left end by a first bearing 28 removably supported on the base 11. At the right end, the shaft 15A is secured to a combined means for rotating and for holding the shaft 15A stationary, generally indicated by the numeral 29, the rotation/holding means being supported by the base 11. Preferably, a heat insulator 30 is disposed in the space between the means 29 and the base and cover. The rotation/holding means may provide the bearing support for the right end of the shaft 15A. Preferably a shear pin 31 makes the ultimate connection between the shaft 15A and the means 29 as a safety feature.

The food baskets 16 are disposed so that a plurality of baskets 16 in one row are uniformly angularly distributed about the axis of the shaft 15A, this embodiment having two rows of such baskets. Where greater food capacity is desired, a third row of baskets may be provided. To support the baskets 16, the shaft 15A has radially projecting supports, the present embodiment having disc shaped supports 32-34, so arranged that one of such supports is disposed at each axial end of each row of baskets 16.

The supports 32-34 are provided with a series or plurality of stub rods 34A which have non-rotatable connections with the supports 32, 33 and with one basket 16, respectively. Preferably, as shown in FIG. 1, the central portion is omitted so that the rod 34A does not extend through or past the food cavity in the basket 16, and to that end, each support rod comprises a short stub rod 34A secured to one disc 33 and a second stub rod 35 secured to another disc support 32. At least one of the stub rods 34A, 35 has a non-rotatable connection with the disc that supports it and with the food basket 16. As shown, one of the rod stubs 34A has a shoulder 36 against which the basket 16 is urged by a spring 37A, this arrangement of structure thus comprising detachment means so that the food basket can be moved to the left against the force of the spring to disconnect the food basket from the stub rod 34A initially and then to disconnect the same from the other stub rod 35.

As best shown on FIG. 2, each drawer 18 has a horizontal ledge 36, 37 at opposite sides thereof, so disposed that its upper surface is above the bottom and below the top of the drawer 18. Supported on the ledges 36, 37 is an apertured grate 38 for directly supporting fuel 39. As shown in FIG. 1, the external end wall 20 has a horizontal handle 40 that facilitates movement of the drawer into and out of the combustion chamber 12. Each drawer also has a series of draft holes 41 in a sidewall, the holes 41 being disposed below the ledges 36, 37 and the grate 38.

As shown in FIG. 2, and as is known, the cover 17 has a hinge 42 along its lower rear marginal edge and a handle 43 along its front lower marginal edge, thereby enabling the cover to be opened to a stable position where it is supported by a stop 44. An apertured lug 45 enables the cover 17 to be pinned in an opened position.

The base 11 at its front upper edge has a working shelf or counter 46 hinged thereto, the same being shown supported in an elevated position and held there by one or more props 47, the prop being hinged along its lower rear vertical edge for being folded clockwise against the front side of the base 11.

It has been found to be highly desirable to include a thermometer 48 to serve as a guide in advising the user whether to admit more air or to reduce the amount of air passing through the cooker in order to achieve a desired baking or broiling temperature.

Figure 3:
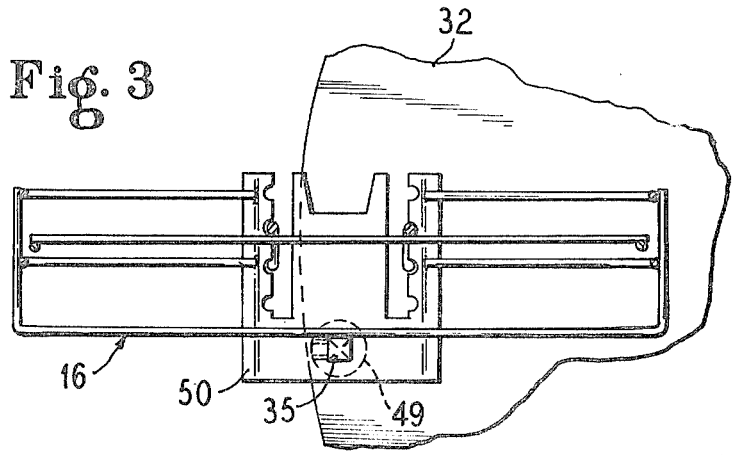
FIG. 3 is an enlarged fragmentary view of a portion of FIG. 2.

As shown in FIG. 3, one of the discs 32, has a square aperture which receives the stub rod 35 which is of square configuration, a collar 49 being secured thereto by a set screw, the basket 16 also having as a part thereof a plate 50 with a square aperture which thus forms part of the non-rotatable connection between the basket and the shaft, and also forms a part of the detachment means described.

When the outdoor cooker 10 is to be used, each of the drawers 18, 18 is withdrawn and is provided with an appropriate amount of charcoal. If only one of the rows of baskets 16 is to be used, only the corresponding portion of that drawer is fueled.

There is some flexibility in use of the outdoor cooker 10. For instance, the food articles can be loaded into the baskets 16 while the drawers are extended and the fire is heating up. Then at an appropriate time, the drawers can be inserted to start the cooking time. On the other hand, the food baskets 16 may have been previously removed and loaded with food articles with the drawers inserted and the cover closed in order to obtain the desired starting temperature as indicated by the thermometer 48. When that temperature is achieved, the cover 17 would be opened and the drawers withdrawn during loading of the food baskets or during installation of the food baskets. As the basket that is being worked upon is either at the 9 o'clock or 10:30 position as shown in FIG. 2, the absence of the heat from below at that time prevents any intense baking of food articles located in the three lowermost positions.

With a proper amount of heat present and the baskets loaded, the shaft 15A is continuously rotated, the cover 17 being closed. The cover retains heat so that there is baking of the food articles when they are up in the cover, and there is broiling of the articles when they are near the fuel. As grease or fat seeps out of the food, the same tends to flow back across itself as the article becomes inverted, thus effecting self-basting. The greatest likelihood of dripping takes place when a basket is in its lowermost position, and therefore grease may drip into the space 25. Preferably, a drain cap on the drain 27 is removed during baking to lessen the likelihood of flaming. However, the cap can be used at other times to prevent dripping. Experience with a given type of food article such as chicken, or sausage, provides a cooking time and temperature which is ideal for a particular taste.

The food basket shown in FIG. 3 is relatively large in its smallest dimension and very nicely accommodates sausages and chicken. However, where hamburger is to be grilled, either the hamburger must be formed as small loaves, or else a somewhat shallower basket must be used because of the soft nature of warm hamburger.

Operation of this device has shown that chicken can be done faster and better without manual turning of the food articles, and that the food is self-basting.

The large cooking capacity of the outdoor cooker was demonstrated in a test using a cooker with three rows of baskets, eight baskets per row. Each basket held 30 hotdogs, and thus 720 hotdogs constituted one load. The cooking time was 20 minutes per load where the hotdogs were initially frozen, and 15 minutes per load where they were loaded in an unfrozen condition. Thus, even allowing for loading and unloading time, a quantity of 8,000 hotdogs was prepared in a period of time between 3 and 4 hours. Thus using machines having a total of six rows, and given enough personnel to service the machines, over 5,000 hotdogs can be prepared per hour. Thus this equipment enables the high-speed feeding of large crowds. The capacity can be reduced by not loading food into one of the rows of baskets, and can be further reduced by not loading all the baskets in a row.

However, an even number of oppositely disposed loaded baskets is preferred so that the load being rotated is substantially at all times balanced.

In another test, appropriate amounts of chicken and sausages were loaded into one machine, the food was baked, and the people were fed and eating was completed by a group of about 70 people, the elapsed time consumed by loading the cooker, baking the food, serving it to the people and the people eating the food being two hours, only one person doing the work of operating the cooker.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A portable outdoor cooker, comprising:
   (a) a portable base having a combustion chamber, two horizontal rows of adjustable draft openings leading to said combustion chamber;
   (b) a shaft supported for rotation across said base, above said combustion chamber;
   (c) a plurality of individual rectangular food baskets rigidly secured to said shaft at a common axial location, all extending radially from said shaft, and each being individually manually detachable and fully removable;
   (d) a pair of elongated drawers receptive of burning fuel extending through a pair of spaced openings in a wall of said base into said combustion chamber, said drawers being movable in a direction parallel to said shaft and laterally spaced from each other at opposite sides of said shaft for enabling selection of heat level and refueling, and for enabling food drippings to enter a grease-drip space therebetween, each of said drawers having a grate supported in upwardly spaced relation to the bottom of each drawer, and each of said drawers having a horizontal row of draft openings disposed in a vertical side wall of said drawer in substantial alignment with said rows of adjustable draft openings in said base, respectively; and
   (e) a cover on said base for enclosing said food baskets during their rotation.

2. A portable outdoor cooker, comprising:
   (a) a portable base having a combustion chamber;
   (b) a shaft supported for rotation across said base, above said combustion chamber;
   (c) a pair of axially spaced radially extending supports corotatably secured to said shaft;
   (d) two sets of aligned pins respectively disposed on said radial supports and uniformly disposed about the axis of said shaft;
   (e) a stop shoulder on one of each pair of aligned ones of said pins;
   (f) a spring encircling the other of each said pair of aligned ones of said pins;
   (g) each said pair of pins including at least one pin of non-circular cross-section;
   (h) a plurality of individual rectangular food baskets disposed between said supports at a common axial location, all extending radially from said shaft, each said basket having a first recess receptive of one of said pair of pins against the force of said spring, and a second recess receptive of the other of said pair of pins, at least one of said recesses being of non-circular cross-section and corotatably receptive of said pin of non-circular section, said spring normally urging said basket against said stop shoulder; and
   (i) a cover on said base for enclosing said food baskets during their rotation.

3. A portable outdoor cooker according to claim 2, said food baskets being arranged in at least two axially spaced common locations, each said location having at least two of said food baskets, and a third radially extending support axially spaced from said pair of radially extending supports, the middle one of said supports having two of said sets of pins extending axially in opposite directions for coacting with paid recesses in said food baskets in both of said locations, respectively.

* * * * *